(12) United States Patent
Behrens et al.

(10) Patent No.: US 9,747,001 B2
(45) Date of Patent: Aug. 29, 2017

(54) METHOD AND SYSTEM FOR TRANSITION BETWEEN COMPUTER GRAPHICS

(71) Applicant: Pebble Technology Corp., Palo Alto, CA (US)

(72) Inventors: Heiko Behrens, Menlo Park, CA (US); Liron Mordechi Damir, San Francisco, CA (US)

(73) Assignee: Pebble Technology Corp., Redwood City, CA (US)

( * ) Notice: Subject to any disclaimer, the term of this patent is extended or adjusted under 35 U.S.C. 154(b) by 0 days.

(21) Appl. No.: 14/887,394

(22) Filed: Oct. 20, 2015

(65) Prior Publication Data

US 2016/0247254 A1    Aug. 25, 2016

Related U.S. Application Data

(60) Provisional application No. 62/120,238, filed on Feb. 24, 2015.

(51) Int. Cl.
| | |
|---|---|
| *G06T 3/00* | (2006.01) |
| *G06T 3/40* | (2006.01) |
| *G06F 3/0482* | (2013.01) |
| *G06F 3/0484* | (2013.01) |
| *G09G 5/00* | (2006.01) |
| *G06F 3/147* | (2006.01) |

(52) U.S. Cl.
CPC ........ *G06F 3/0482* (2013.01); *G06F 3/04842* (2013.01); *G06F 3/147* (2013.01); *G06T 3/0093* (2013.01); *G06T 3/40* (2013.01); *G09G 5/003* (2013.01); *G06T 2210/44* (2013.01); *G09G 2320/08* (2013.01); *G09G 2340/145* (2013.01); *G09G 2354/00* (2013.01)

(58) Field of Classification Search
CPC ... G06T 2210/44; G06T 3/0093; G06T 13/00; G06T 13/80; G06T 15/205
See application file for complete search history.

(56) References Cited

U.S. PATENT DOCUMENTS

| | | |
|---|---|---|
| D743,278 S | 11/2015 | Solomon |
| 9,560,629 B2 | 1/2017 | Migicovsky et al. |
| 2008/0260274 A1* | 10/2008 | Winder ................ G06K 9/4671 382/248 |

* cited by examiner

*Primary Examiner* — Todd Buttram
(74) *Attorney, Agent, or Firm* — Rutan & Tucker LLP

(57) ABSTRACT

An apparatus, that can be in the form of a wearable device, comprising a display, a memory, and a processor coupled to the display and memory. The processor retrieves a first set of points describing a first vector for a first display element; retrieves a second set of points describing a second vector for a second display element; modifies the first set of points by modifying one or more points in the first set of points to form a modification of the first vector; modifies the second set of points by modifying one or more points in the second set of points to form a modification of the second vector; and sequentially renders in the display the first vector, the modification to the first vector, the second vector with the modification to the second vector, and the second vector without the modification to the second vector.

34 Claims, 9 Drawing Sheets

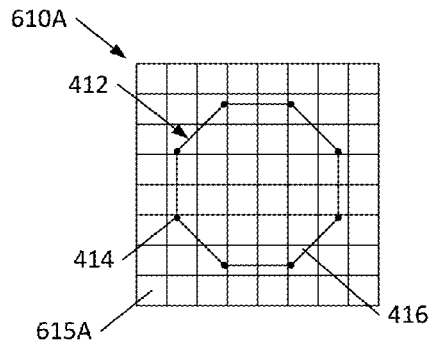
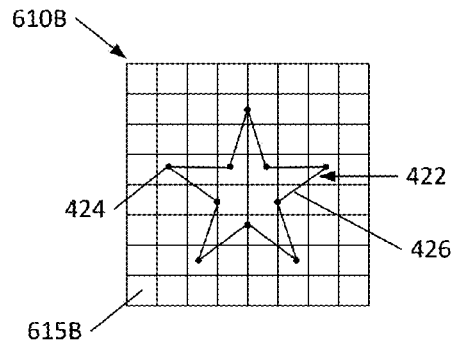
FIG. 6A  FIG. 6B
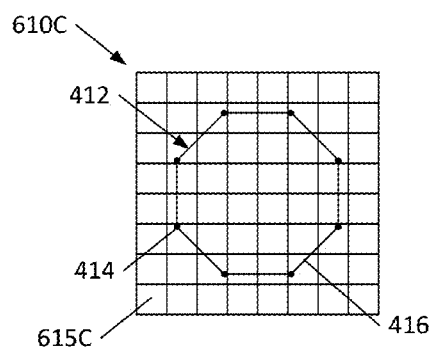
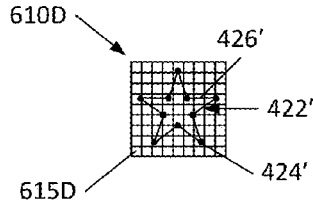
FIG. 6C  FIG. 6D

METHOD AND SYSTEM FOR TRANSITION BETWEEN COMPUTER GRAPHICS

CROSS REFERENCE TO RELATED APPLICATION

This application claims the benefit of U.S. Provisional Application No. 62/120,238, entitled "Smartwatch or Other Notification Device Configured to Intuitively Interact with a User Based on Time and the Way the User Uses the Device" and filed Feb. 24, 2015, the contents of which application are incorporated herein by reference.

TECHNICAL FIELD

A system and method for causing a graphic on a device display to appear to morph to a different graphic.

SUMMARY

A computer-implemented method for displaying an initial vector graphic and replacing the initial vector graphic with a new vector graphic while giving the appearance that the initial vector graphic morphs into the new vector graphic. The method comprises steps of retrieving, by a processing device, a first set of points describing a first vector for a first display element from a first memory location; retrieving, by the processing device, a second set of points describing a second vector for a second display element from a second memory location; modifying, by the processing device, the first set of points by modifying one or more points in the first set of points to form a modification of the first vector; modifying, by the processing device, the second set of points by modifying one or more points in the second set of points to form a modification of the second vector; and displaying on a display coupled to the processing device the first vector, then displaying on the display the modification of the first vector to display the modified first vector on the display, then replacing the modified first vector with a modified second vector on the display, then removing the modification of the second vector from the modified second vector to display the second vector on the display. The modified first vector comprises one or more points. The step of replacing the modified first vector with the modified first vector is performed when a deviation of the one or more points of the modified first vector is at or near a maximum.

A tangible computer readable medium comprising software instructions stored thereon that when executed by a processing device cause the processing device to perform steps of retrieving, by the processing device, a first set of points describing a first vector for a first display element from a first memory location; retrieving, by the processing device, a second set of points describing a second vector for a second display element from a second memory location; modifying, by the processing device, the first set of points by modifying one or more points in the first set of points to form a modification of the first vector; modifying, by the processing device, the second set of points by modifying one or more points in the second set of points to form a modification of the second vector; and displaying on a display coupled to the processing device the first vector, then displaying on the display the modification of the first vector to display the modified first vector on the display, then replacing the modified first vector with a modified second vector on the display, then removing the modification of the second vector from the modified second vector to display the second vector on the display. The modified first vector comprises one or more points. The step of replacing the modified first vector with the modified first vector is performed when a deviation of the one or more points of the modified first vector is at or near a maximum.

A smartwatch comprising a display, a memory, and a processor coupled to the display and to the memory. The processor is for retrieving a first set of points describing a first vector for a first display element from a first location in the memory; retrieving a second set of points describing a second vector for a second display element from a second location in the memory; modifying the first set of points by modifying one or more points in the first set of points to form a modification of the first vector; modifying the second set of points by modifying one or more points in the second set of points to form a modification of the second vector; and displaying on the display the first vector, then displaying on the display the modification of the first vector to display the modified first vector on the display, then replacing the modified first vector with a modified second vector on the display, then removing the modification of the second vector from the modified second vector to display the second vector on the display. The modified first vector comprises one or more points. The replacement of the modified first vector with the modified first vector is performed when a deviation of the one or more points of the modified first vector is at or near a maximum.

BRIEF DESCRIPTION OF THE DRAWINGS

For the purpose of illustration, there are shown in the drawings various methods and systems. In the drawings, like numerals indicate like elements throughout. It should be understood that the invention is not limited to the precise arrangements, dimensions, and instruments shown. In the drawings:

FIGS. 6A through 6D illustrate how the deviations of FIGS. 5A and 5B are further distorted based on the locations of the points of the first and second vectors.

DETAILED DESCRIPTION

Figure 1A:
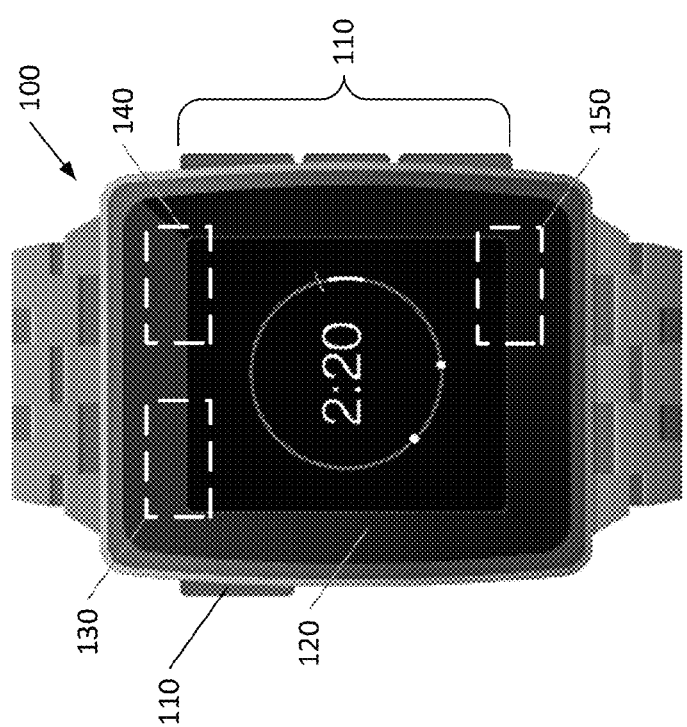
FIG. 1A illustrates a smartwatch comprising one or more user inputs, a display, a processor coupled to the processor, and at least one memory, the display for rendering a first vector, then displaying one or more modifications to the first vector to display one or more respective modified first vectors, then replacing a last of the modified one or more respective first vectors with a modified second vector, then removing one or more modifications from the second modified vector to display a second vector.
Figure 1C:
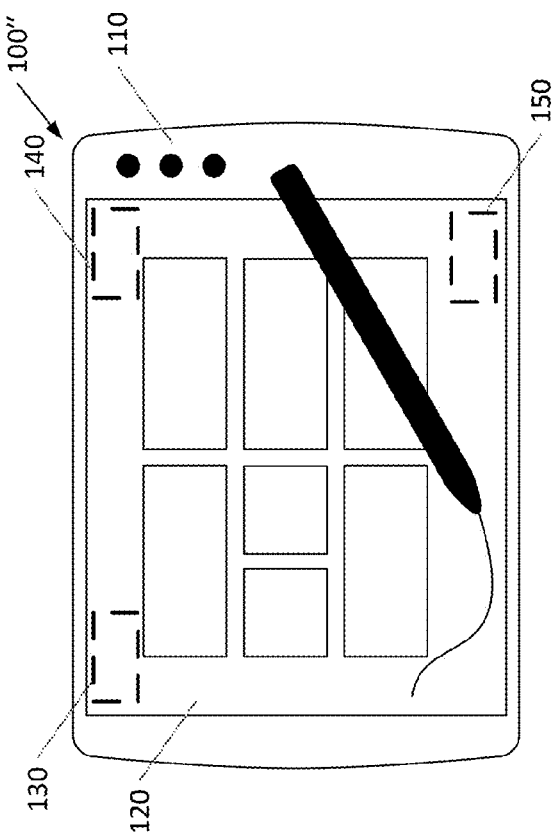
FIG. 1C illustrates a tablet computer comprising one or more user inputs, a display, a processor coupled to the processor, and at least one memory, the display for rendering a first vector, then displaying one or more modifications to the first vector to display one or more respective modified first vectors, then replacing a last of the modified one or more respective first vectors with a modified second vector, then removing one or more modifications from the second modified vector to display a second vector.
Figure 1B:
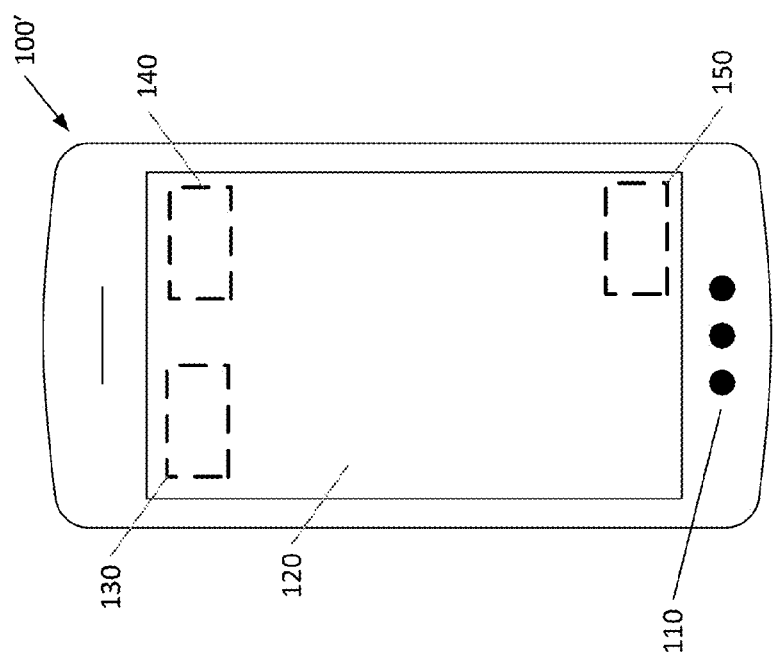
FIG. 1B illustrates a smartphone comprising one or more user inputs, a display, a processor coupled to the processor, and at least one memory, the display for rendering a first vector, then displaying one or more modifications to the first vector to display one or more respective modified first vectors, then replacing a last of the modified one or more respective first vectors with a modified second vector, then removing one or more modifications from the second modified vector to display a second vector.

Referring now to FIG. 1A, there is illustrated a computing device, generally designated as 100. The computing device 100 comprises one or more user inputs 110, a display 120, a processing device 130 coupled to the one or more user inputs 110 and to the display 120, a primary storage 140 coupled to the processing device 130, and a secondary storage 150 coupled to the processing device 130. As illustrated, the computing device 100 may be a wearable electronic device, such as a smartwatch. It is to be understood, however, that the computing device 100 may be any computing device, such as a smart phone 100' illustrated in FIG. 1B, a tablet computer 100" illustrated in FIG. 1C, a personal computer, a laptop computer, etc.

The user inputs 110 may comprise one or more selectable buttons for controlling the operation of the computing device 100. In alternative embodiments, the user input may be a touch screen, a scroll bar or a combination of any of these and buttons. In this example, the user inputs 110 may be used by a user for selecting operations to be performed by the computing device 100, such as scrolling operations, screen-change operations, control selection operations, data selection operations, etc. The display 120 may be any black and white; black, white, and gray, e.g., grayscale; or color display. Thus, the display 120 may be an LCD display, and LED display, an OLED display, an electronic paper display, a touchscreen display, etc.

The processing device 130 may be a processor, microprocessor, computing device, application specific integrated circuit (ASIC), controller, or the like. The functionality described herein as being performed by the computing device 100 is done so by the processing device 130 upon loading and executing software code or instructions. The software code or instructions are tangibly stored in the secondary storage 150. The processing device 130 retrieves the software code or instructions from the secondary storage 150 and places them in the primary storage 140. The processing device 130 loads the software code or instructions from the primary storage 140 and executes them to perform the functionality of the computing device 100 or the processing device 130 described herein.

The primary storage 140 may be any kind of computer memory, such as any kind of addressable semiconductor memory, such as volatile memory or nonvolatile memory. Non-volatile memory may include any of ROM, PROM, EPROM, and EEPROM memory. Volatile memory may include any of RAM (e.g., SRAM, DRAM, etc.), and CPU cache memory, such as static RAM, SRAM, etc.

The secondary storage 150 may be any kind of tangible computer-readable medium, such as a magnetic medium, e.g., a computer hard drive, an optical medium, e.g., an optical disc, a solid-state memory, e.g., a flash memory, and other storage media known in the art. Thus, any of the functionality performed by the processing device 130 described herein is implemented in software code or instructions that are tangibly stored on the secondary storage 150.

Upon loading the software instructions into the primary storage 140 from the secondary storage 150 and executing such software code or instructions by the processing device 130, the processing device 130 may perform any of the functionality of the computing device 100 or the processing device 130 described herein, including any steps of the method 300 described below.

Figure 2:
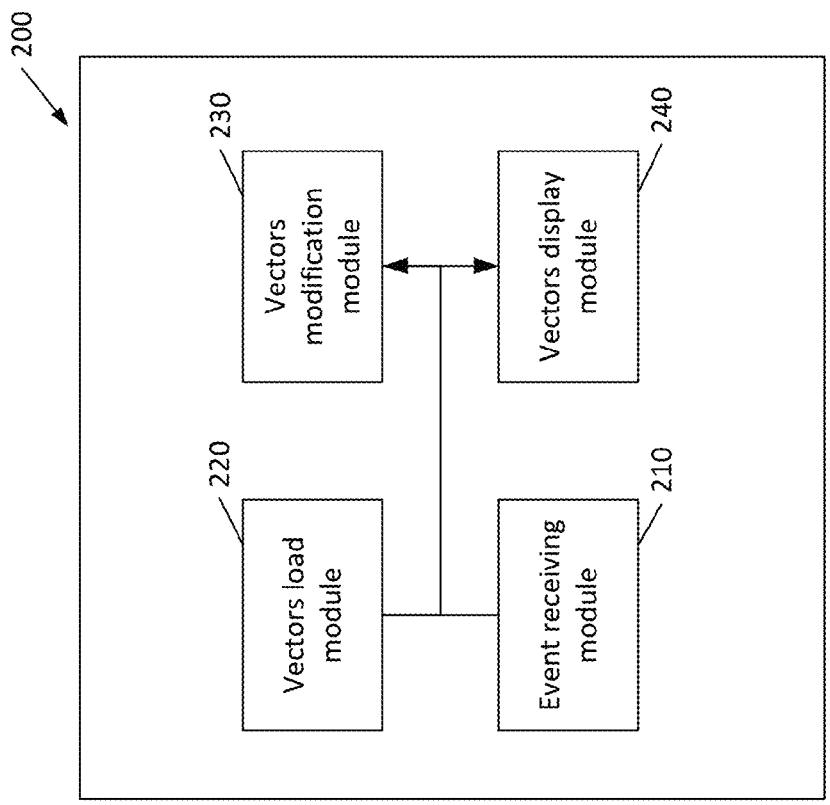
FIG. 2 illustrates a software architecture implemented by the smartwatch of FIG. 1A, the smartphone of FIG. 1B, and the tablet computer of FIG. 1C.
Figure 3:
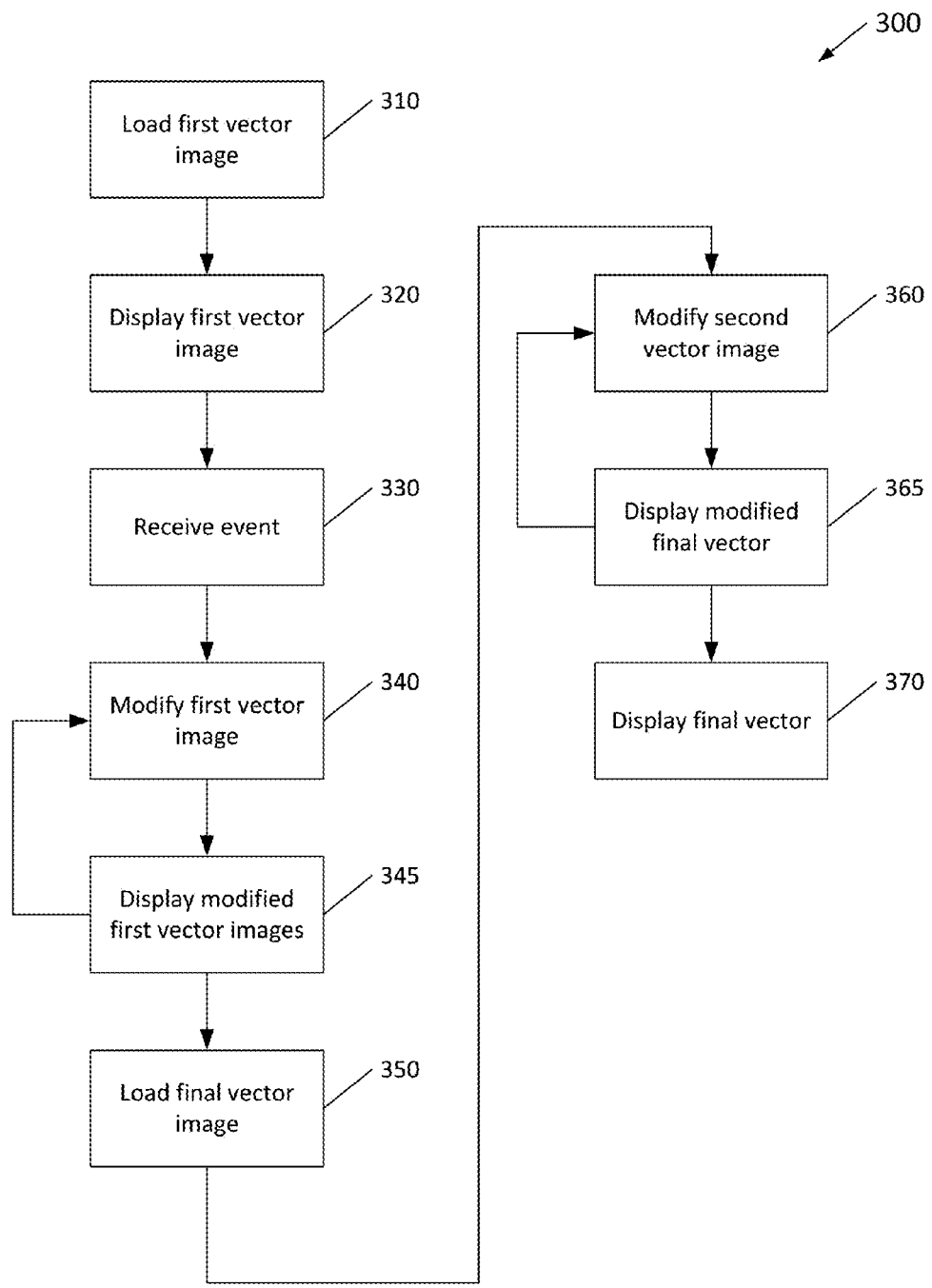
FIG. 3 illustrates a method performed by the software architecture of FIG. 2.

Illustrated in FIG. 2 is a software framework 200 implemented by the processing device 130 of the computing device 100. Illustrated in FIG. 3 is a method 300 for modifying a vector image displayed on the display 120 of the computing device 100. The computing device 100, specifically the processing device 130 thereof, performs the method 300 when implementing the framework 200. The software framework 200 is provided by the software code or instructions that are tangibly stored in the secondary storage 150. Thus, the processing device 130 implements the software framework 200 by loading the software instructions into the primary storage 140 and executing such software code or instructions.

With reference to FIGS. 1 through 3, the software framework 200 comprises an event receiving module 210, a vectors load module 220, a vectors modification module 230, and a vectors display module 240 implemented by the processing device 130 to perform the method 300. In a Step 310, the vectors load module 220 loads a first (or initial) vector from a first location in the secondary storage 150 and stores it in a first location in the primary storage 140. The first vector is a beginning vector comprising a plurality of points connected by lines and/or curves for being displayed on the display 120 as a first vector image. The vectors load module 220 retrieves the first vector from the first location in the primary storage 140 and passes it to the vectors display module 240, which receives the first vector from the vectors load module 220 and renders it as a first vector image on the display 120 of the computer device 100, Step 320.

During operation of the computing device 100, the event receiving module 210 receives an event, Step 330. The event may indicate reception of a user input from one of the one or more user inputs 110 or from a touch-selection on the display 120 of the computing device 100. Such input may be a selection of an operation to be performed by the computing device 100, such as a scrolling operation, a change of focus in the display 120 from one software application to another software application, or a screen-change operation from one screen in a software application to another screen in the software application; a selection of a piece of data displayed in the display 120; etc. In another embodiment, the event may indicate a change that occurs automatically without reception of any user input. The event may indicate a step or change driven by a program being executed by the processing device 130, e.g., a change in time (which can be shown as movement of the hands on a clock rendered in the display 120), change of weather (which can be shown as a change in a weather icon), etc. For example, where a music application is playing a song and that song changes automatically to the next song, the event may indicate the change of the song to the next song.

The vectors modification module 230 receives the first vector from the vectors load module 220 in a Step 340 and repeatedly modifies the first vector to form a sequence of 1st through (N−1)th modifications to the first vector by modifying one or more points of the first vector to form a sequence of 1st through (N−1)th modified first vectors for being displayed in the display 120 as 1st through (N−1)th modified first vector images. After calculating each modification to the first vector, the vectors modification module 230 sequentially passes each of the 1st through (N−1)th modifications to the first vector or each of the 1st through (N−1)th modified first vectors to the vectors display module 240, which sequentially receives and renders (displays) each modification to the first vector (or each of the 1st through (N−1)th modified first vectors) in the display 120 after rendering the first vector in the display 120, Step 345.

Specifically, in the Step 345, the vectors display module 240 renders (displays) a first of the modifications to the first vector image rendered (displayed) in the display 120 to display a first of the modified first vector images. After the method 300 loops back to the Step 340, the vectors display module 240 then replaces the first of the modifications to the first vector image with a second of the modifications to the first vector image to display a second of the modified first vector images in the Step 345, etc. The vectors display module 240 continues looping back to the Step 340 and replacing previous modifications to the first vector image with subsequent modifications to the first vector image to display subsequent ones of the modified first vector images in the Step 345 until rendering (displaying) a last ((N−1)th) of the modified first vector images in the Step 345. The display of the sequence of 1st through (N−1)th modified first vector images may result in a gradually (or progressively) scattered appearance being imparted on the first vector image as its 1st through (N−1)th modifications are displayed. After displaying a last ((N−1)th) of the modified first vector images, the method 300 continues to a Step 350.

Based upon the received event, in the Step 350, the vectors load module 220 loads a second (or final) vector from a second location in the secondary storage 150 and stores it in a second location in the primary storage 140. The second vector is an ending vector comprising a plurality of points connected by lines and/or curves for being displayed in the display 120 as a second vector image. The vectors load module 220 retrieves the second vector from the second location in the primary storage 140 and passes it to the vectors modification module 230.

The vectors modification module 230 receives the second vector from the vectors load module 220 in a Step 360 and repeatedly modifies the second vector to form a sequence of 1st through (M−1)th modifications to the second vector by modifying one or more points of the second vector to form a sequence of 1st through (M−1)th modified second vectors for being displayed in the display 120 as 1st through (M−1)th modified second vector images. After calculating each modification to the second vector, the vectors modification module 230 sequentially passes each of the 1st through (M−1)th modifications to the second vector or each of the 1st through (M−1)th modified second vectors to the vectors display module 240, which sequentially receives and renders (displays) each of the 1st through (M−1)th modifications to the second vector (or each of the 1st through (M−1)th modified second vectors) in the display 120 after replacing the final ((N−1)th) one of the modified first vectors with a first one of the modified second vectors, Step 365.

Specifically, in the Step 365, the vectors display module 240 replaces the last of the modified first vector images rendered (displayed) on the display 120 with a first of the modified second vector images, which incorporates a first of the modifications to the second vector image. After the method 300 loops back to the Step 360, the vectors display module 240 then displays a second of the modifications to the second vector image, for example by removing the first of the modifications to the second vector and replacing them with a second of the modifications to the second vector, to display a second of the modified second vector images, etc. The vectors display module 240 continues looping back to the Step 360 replacing previous modifications and displaying further modifications to the second vector to display subsequent ones of the modified second vector images in the Step 365 until rendering (displaying) a last ((M−1)th) of the modified second vector images in the Step 365, at which time, in a Step 370, the vectors display module 240 replaces the last (M−1)th of the modified second vector images with the second (final) vector image in the display 120. The display of the sequence of 1st through (M−1)th modified second vector images followed by the second vector image may result in an appearance of the second vector image gradually (or progressively) appearing from a scattered appearance, i.e., that the first of the modified second vector images gradually (or progressively) converges on the second vector image. The method 300 is thereby complete.

The method 300 provides an appearance of a first vector image that is displayed in the display 120 as being progressively modified, e.g., scattered or distorted, to a maximum and then having such modifications, e.g., scattering or distortions, progressively removed until a second vector image appears. The effect of the second vector image appearing as the modifications (scattering or distortion) are removed is achieved by replacing the (N−1)th modified first vector image at a point in which its modifications achieve a maximum relative to the first vector image with the second vector image, itself modified to a maximum relative to the second vector image and then progressively or sequentially removing its modifications until the second vector image appears. The result is an animation of the first vector image being modified (scattered or distorted) and then a second vector image gradually appearing from the modified (scatter or distorted) first vector image.

Figure 4A:
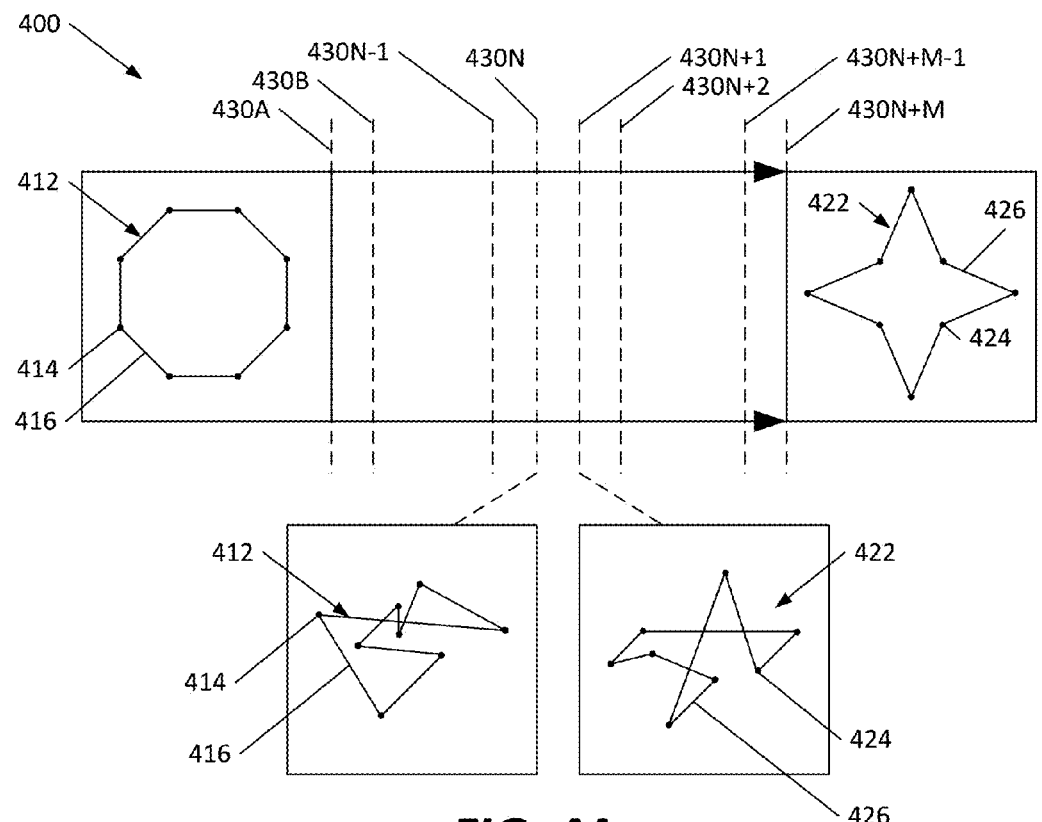
FIG. 4A through 4D illustrate various vector-image operations performed by the software architecture of FIG. 2 in accordance with the method of FIG. 3.

Referring now to FIG. 4A, there is illustrated an operation 400 performed by the architecture 200 using the method 300 for rendering a first vector image 412 in a first representation 430A in the display 120 of the computing device 100 and replacing it with a second vector image 422 in a N+Mth representation 430N+M in the display 120 of the computing device 100. Reference to Steps 320, 340, 345, 360, 365, and 370 of the method 300 is made below in the description of the operation 400.

The first vector image 412 comprises a plurality of points 414 and a plurality of line segments 416 connecting the points 414, and the second vector image 422 comprises a plurality of points 424 and a plurality of line segments 426 connecting the points 424. Generally, the operation 400 involves displaying the first vector image 412 (Step 320), modifying one or more points 414 of the first vector image 412 (Step 340), displaying the modifications to the first vector image 412 to display at least one modified first vector image 412 (Step 345), modifying one or more points 424 of the second vector image 422 (Step 360), displaying the modified second vector image 422 by replacing the modified first vector image 412 with the modified second vector image 422 (Step 365), and removing the modifications to the second vector image 422 to display the second vector image 422 (Step 370). The number of points 414 of the first vector image 412 may equal the number of points 424 of the second vector image 422.

The Step 340 of modifying the first vector image 412 may comprise modifying the first vector image 412 by progressively greater amounts to provide a plurality of 1st through (N−1)th modified first vector images 412, and the Step 345 of displaying the modified first vector image 412 may comprise sequentially displaying each of the 1st through (N−1)th modifications to the first vector image 412, one after another, while replacing previously displayed modifications to the first vector image 412. The Step 360 of modifying the second vector image 422 may comprise progressively modifying the second vector image 422 by progressively lesser amounts to provide a plurality of 1st through (M−1)th modified second vector images 422, and the Step 365 of displaying the modified second vector image 422 may comprise sequentially displaying each of the 1st through (M−1)th modifications to the second vector images 422, one after another, while replacing previously displayed modifications to the second vector image 422.

The first vector image 412 in the representation 430A is replaced by N−1 modified forms of the first vector image 412 in the representations 430B through 430N in the Step 345. In the Step 340, the first vector image 412 is progressively modified to each of a plurality of representations 430B through 430N from the representation 430A that is illustrated, and in the Step 345, the 1st through (N−1)th modifications to the first vector image in each of the respective plurality of representations 430B through 430N are displayed replacing previously displayed modifications to the first vector image 412. Such modifications are effected by moving the points 414 of the image 412 in the representation 430A by progressively greater amounts in each of the plurality of representations 430B through 430N, respectively, to generate the N−1 modified first vector images 412, respectively. Thus, because the line segments 416 connect respective points, the line segments 416 move as the points 414 are moved, thereby modifying the shape of the first vector image 412 in each of the representations 430B through 430N in the display 120 from the illustrated representation 430A in the display 120.

As illustrated, the first vector image 412 is an octagon in the representation 430A, and the (N−1)th modified first vector image 412 has a scattered appearance in the representation 430N. The shape of the 1st through (N−2)th modified first vector images 412 is not illustrated in the respective representations 430B through 430N−1. It is to be understood, however, that the representations 430B through 430N−1 give the appearance of the octagon in the representation 430A as gradually scattering or distorting to a chaotic appearance by having its points 414 progressively scatter or distort until it has a scattered or distorted appearance as shown in the representation 430N.

The modified first vector image 412 in the representation 430N in the display 120 is then replaced by a first modified form of the second vector image 422 in a representation 430N+1 in the display 120 in the Step 365. In the Step 360, the second vector image 422 is progressively modified to each of a plurality of representations 430N+1 through 430N+M−1 from the representation 430N that is illustrated, and in the Step 365, the 1st through (M−1)th modifications to the second vector image 422 in each of the respective plurality of representations 430N+1 through 430N+M−1 are displayed replacing previously displayed modifications to the second vector image 422. Such modifications are effected by moving the points 424 of the image 422 in the representation 430N+M by progressively lesser amounts in each of the plurality of representations 430N+1 through 430N+M−1, respectively, to generate the (M−1)th modified second vector images 422, respectively. Thus, because the line segments 426 connect respective points, the line segments 426 move as the points 424 are moved, thereby modifying the shape of the second vector image 422 in each of the representations 430N+1 through 430N+M−1 compared to the representation 430N+M that is illustrated. After the (M−1)th modified second vector image 422 is displayed in the representation 430N+M−1, in the Step 370 it is replaced by the second vector image 422 in the representation 430N+M by removing a last of the modifications to the second vector image 422 from the (M−1)th modified second vector image 422.

As illustrated, the second vector image 422 is a four-point star in the representation 430N+M, and the 1st modified second vector image 422 has a scattered appearance in the representation 430N+1. The shape of the 2nd though (M−2)th modified second vector image 422 is not illustrated in the respective representations 430N+1 through 430N+M−1. It is to be understood, however, that the representations 430N+1 through 430N+M−1 give the appearance of the star in the representation 430N+M as gradually appearing from a chaotic appearance by having its points 424 progressively de-scatter or un-distort until it has an orderly appearance as shown in the representation 430N+M.

As illustrated, the first vector image 412 and its 1st through (N−1)th modifications are rendered (displayed) on the display 120 by the vectors display module 240 in the Steps 320 and 345 as a sequence of N unique representations, each representation replacing a previous one. Additionally, the second vector image 422 and its 1st through (M−1)th modifications are rendered (displayed) on the display 120 by the vectors display module 240 in the Steps 365 and 370 as a sequence of M unique representations, each representation replacing a previous one. In an alternative embodiment, not all modifications may be displayed by the display 120.

M and N may be chosen depending on the desired length of time of the transition from the first vector image 312 to the second vector image 422 and the refresh rate of the display 120. If it is desired that the length of the transition be 1 second, and the display 120 has a refresh rate of 30 frames per second (FPS), then M may be chosen to be 15, and N may be chosen to be 15. It is to be understood that N may equal M but need not be equal. As an example, N=20 and M=10. Furthermore, it is to be understood that the transition time need not be 1 second. It is contemplated that the transition time may be 300 milliseconds or any other length of time.

Modification of the position of a point of the first vector image 412 or the second vector image 422 involves modifying both the x-coordinate and y-coordinate of the point, $p_0=(x_0, y_0)$. In this example, the object or image may be a two-dimensional object or image with x and y coordinates. In yet another embodiment, the object or image may be a three-dimensional object or image with x, y and z coordinates. Modification of a point may be expressed as a function of time. The modified point, $p(t)=(x_t, y_t)$ is expressed as follows:

$$p(t) = p0 + \text{delta}(p0, t) \quad (1)$$

where:

$$\text{delta}(p0, t) = A(t) \cdot \text{dist}(p0, t) \quad (2)$$

and:

$$A(t) = S(t) \cdot \sin(\phi t) \quad (3)$$

In equation (1), p0 is a point in the first vector image 412 or the second vector image 422, and delta(p0, t) expresses a modification of the point at time, t. In equation (2), delta (p0,t) is expressed as the product of an amplitude, A(t), and a distortion, dist(p0,t), that changes over time and which depends upon the original point. Equation (3) describes the amplitude, A(t). As seen, the amplitude is a sine function with a frequency of, ϕ, which may be set to a desired value to set how quickly the transition from the first vector image 412 to the second vector image 422 is to take place. S(t) is a scaling factor that is used when the first vector image 412 is to be scaled up or down to the second vector image 422 over time. When no scaling is needed, S(t)=1, as it is in FIG. 4A.

Figure 5A:
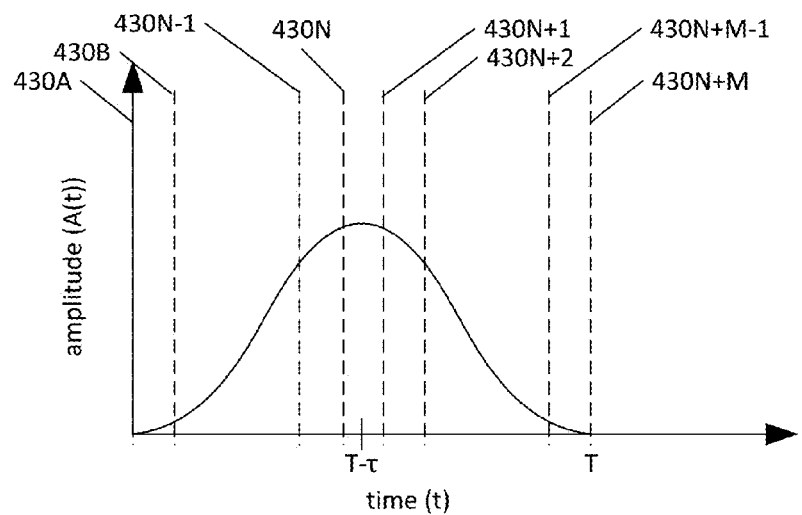
FIGS. 5A and 5B illustrate charts showing the deviations to the points of the first and second vectors over time.

Referring now to FIG. 5A, there is illustrated a chart of the amplitude, A(t), plotted over time. The amplitude, A(t), specifies the amount of deviation or movement of the points of the 1st through (N−1)th modified first vector images 412 in the respective representations 430B through 430N over time compared to the first vector image 412 in the representation 430A, and the amount of deviation or movement of the points 424 of the 1st through (M−1)th modified second vector images 422 in the respective representations 430N+1 through 430N+M−1 over time compared to the second vector image 422 in the representation 430N+M. As seen in the chart, the deviation or movement of the points 414 of the first vector image 412 increases over time, and the deviation of the points 424 of the second vector image 422 decreases over time.

Time t=T−τ corresponds to the time in which the (N−1)th modified vector image 412 in the representation 430N is replaced by the 1st modified second vector image 422 in the representation 430N+1. The replacement is chosen at this time because the deviation or movement of the points 414 of the (N−1)th modified first vector image 412 in the representation 430N compared to the first vector image 412 in the representation 430A is at or near (within 10% of) a maximum (or local maximum), as is the deviation or movement of the points 424 of the 1st modified second vector image 422 in the representation 430N+1 compared to the second vector image 422 in the representation 430N+M.

The deviation or movement of each of the points may be distorted over time by a distortion factor, dist(p0,t), which is based on the original positions of each of the points in the first vector image 412 and in the second vector image 422. As expressed by dist(p0,t), the distortion applied to a point, p(t), depends on its original position and changes over time. The distortion factor, dist(p0,t), specifies the amount of distortion of the deviation of the x- and y-coordinates of the point, p(t), over time. For any of the points, the deviation or movement of the x- and y-coordinates of the point may be subject to the same distortion, dist(p0,t), or different distortions. For example, at a point in time, the deviation of the x-coordinate of a point may be distorted by +1.8, and the deviation of the y-coordinate of the point may also be distorted by +1.8. Alternatively, the y-coordinate of the point may be distorted by −2.4.

The distortion applied to the deviation or movement of the points 414 may depend on their relative position in the first vector image 412, and the distortion applied to the deviation or movement of the points 424 may depend on their relative position in the second vector image 422. Alternatively, the distortion applied to the deviation or movement of the points 414, 424 may vary randomly across the vector image 412, 422, so that the distortion applied to the deviation or movement of one point as compared to another point is randomly selected.

Distortion may also be specified by the location of the points of the vector images 412 and 422 in grids overlaid upon the vector images 412 and 422. Illustrated in FIG. 6A is a grid 610A overlaid on the first vector image 412 in its initial representation 430A. The grid 610A comprises a plurality of cells 615A, each of which is assigned a distortion that is a function of time. If a point 414 of the first vector image 412 in its initial representation 430A falls within a cell 615A, the distortion specified by such cell is applied to such point when generating the representations 430B through 430N of the 1st through (N−1)th modified first vector images 412. Such distortion specifies an amount that the amount of deviation or movement of a point is to be distorted during each modification. It is to be understood that the grid 610A is for illustration purposes only. It illustrates that distortion may be applied to the amount of deviation or movement of the points 414 of the first vector image 412 based on the location of the points 414.

Illustrated in FIG. 6B is a grid 610B overlaid on the second vector image 422 in its final representation 430N+M. The grid 610B comprises a plurality of cells 615B, each of which is assigned a distortion that is a function of time. If a point 424 of the second vector image 422 in its final representation 430N+M falls within a cell 615A, the distortion specified by such cell is applied to such point when generating the representations 430N+1 through 430N+M−1 of the 1st through (M−1)th modified second vector images 422. Such distortion specifies an amount that the amount of deviation or movement of a point is to be distorted during each modification. It is to be understood that the grid 610B is for illustration purposes only. It illustrates that distortion may be applied to the amount of deviation or movement of the points of the second vector image 422 based on their relative positions in the final representation 430N+M to generate the placement of the points 424 in the representations 430N+1 through 430N+M−1.

The grids 610A and 610B may be normalized with respect to the first vector image 412 and the second vector image 422 so that the number of cells 615A and 615B and the relative placement thereof are the same. The closer that two cells are to one another, the more similar the distortion is. For example, the points in the cells adjacent to 615A will experience a similar distortion to the points in cell 615A. In an exemplary embodiment, because the number of cells 615A and 615B are equal, cells 615A and 615B having the same relative positions in the grids 610A and 610B specify the same or similar distortions. The result is that points in such cells 615A and 615B will scatter in similar ways and end up close to one another in the adjacent representations 430N and 430N+1. The result is that when the first modified vector image 412 in the representation 430N is replaced by the second modified vector image 422 in the representation 430N+1 in the display 120, the replacement is not discernible to the viewer of the display 120. Rather, the first vector 412 looks to morph into the second vector 424.

Figure 4B:
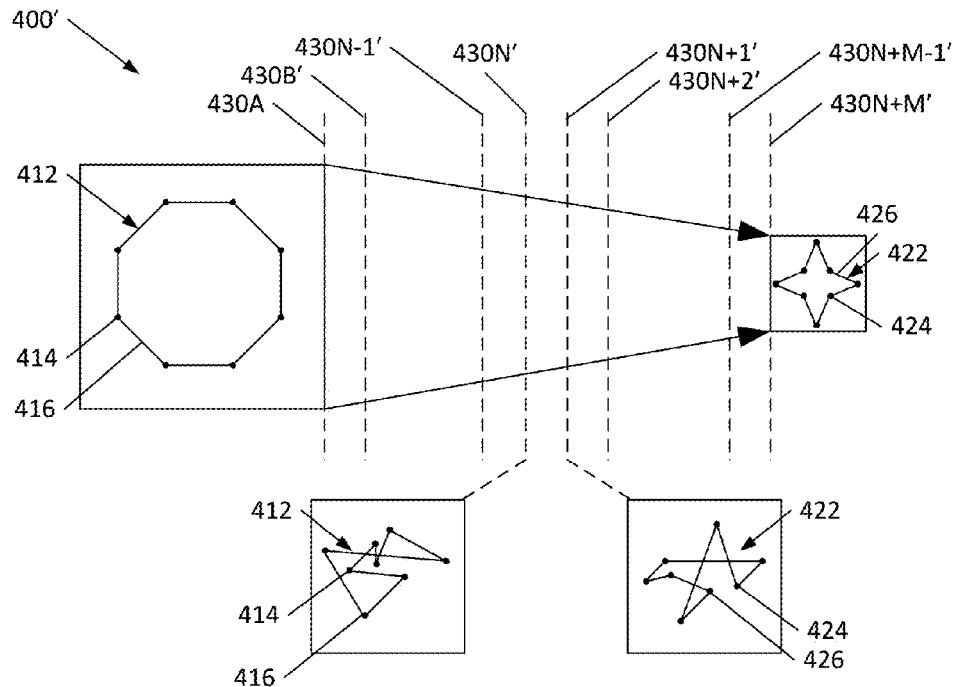

Referring now to FIG. 4B, there is illustrated an operation 400' performed by the architecture 200 using the method 300 for rendering the first vector image 412 in the first representation 430A in the display 120 of the computing device 100 and replacing it with a second vector image 422 in a smaller representation 430N+M' in the display 120 of the computing device 100. Reference to Steps 320, 340, 345, 360, 365, and 370 of the method 300 is made below in the description of the operation 400'.

Generally, the operation 400' involves displaying the first vector image 412 (Step 320), modifying one or more points 414 of the first vector image 412 (Step 340), displaying the modifications to the first vector image 412 to display at least one modified first vector image 412 (Step 345), modifying one or more points 424 of the second vector image 422 (Step 360), displaying the modified second vector image 422 by replacing the modified first vector image 412 with the modified second vector image 422 (Step 365), and removing the modifications to the second vector image 422 to display the second vector image 422 (Step 370). The number of points 414 of the first vector image 412 may equal the number of points 424 of the second vector image 422.

The Step 340 of modifying the first vector image 412 may comprise modifying and shrinking the first vector image 412 by progressively greater amounts to provide a plurality of 1st through (N−1)th modified first vector images 412, and the Step 345 of displaying the modified first vector image 412 may comprise sequentially displaying each of the 1st through (N−1)th modifications to the first vector images 412, one after another, while replacing previously displayed modifications to the first vector image 412. The Step 360 of modifying the second vector image 422 may comprise progressively modifying and expanding and the second vector image 422 by progressively lesser amounts to provide a plurality of 1st through (M−1)th modified second vector images 422, and the Step 365 of displaying the modified second vector image 422 may comprise sequentially displaying each of the plurality of the 1st through (M−1)th modifications to the second vector images 422, one after another, while replacing previously displayed modifications to the second vector image 422.

The first vector image 412 in the representation 430 is replaced by N−1 modified forms of the first vector image 412 in the representations 430B' through 430N' in the Step 345. In the Step 340, the first vector image 412 is progressively modified and shrunk to each of a plurality of representations 430B' through 430N' from the representation 430A that is illustrated, and in the Step 345, the 1st through (N−1)th modifications to the first vector image in each of the respective plurality of representations 430B' through 430N' are displayed replacing previously displayed modifications to the first vector image 412. Such modification and shrinking are effected by moving the points 414 of the image 412 in the representation 430A by progressively greater amounts in each of the plurality of representations 430B' through 430N', respectively, wherein the modified first vector image 412 in each of the plurality of representations 430B' through 430N' defines a perimeter covering a progressively smaller area from the representation 430B' to the representation 430N', thereby effecting the aforementioned shrinking Thus, because the line segments 416 connect respective points, the line segments 416 move as the points 414 are moved, thereby modifying and shrinking the shape of the first vector image 412 in each of the representations 430B' through 430N' in the display 120 from the illustrated representation 430A in the display 120.

As illustrated, the first vector image 412 is an octagon in the representation 430A, and the (N−1)th modified first vector image 412 has a scattered appearance in the representation 430N' having a perimeter that covers a surface area that is less than that of the octagon. The shape of the 1st through (N−1)th modified first vector images 412 is not illustrated in the respective representations 430B' through 430N−1'. It is to be understood, however, that the representations 430B' through 430N−1' give the appearance of the octagon in the representation 430A as gradually scattering or distorting to a chaotic appearance while shrinking by having its points 414 generally move toward the original center point of the octagon until it has a scattered (or distorted), shrunken appearance as shown in the representation 430N'.

The modified first vector image 412 in the representation 430N' in the display 120 is then replaced by a first modified and expanded form of the second vector image 422 in a representation 430N+1' in the display 120 in the Step 365. In the Step 360, the second vector image 422 is progressively modified and expanded by progressively lesser amounts to each of a plurality of representations 430N+1' through 430N+M−1' from the representation 430N' that is illustrated, and in the Step 365, the 1st through (M−1)th modifications to the second vector image 422 in each of the respective plurality of representations 430N+1' through 430N+M−1' are displayed replacing previously displayed modifications to the second vector image 422. Such modification and expansion is effected by moving the points 424 of the image 422 in the representation 430N+M' by progressively lesser amounts in each of the plurality of representations 430N+1' through 430N+M−1', respectively, to generate the 1st through (M−1)th modified second vector images 422, respectively, wherein the modified second vector image 412 in each of the plurality of representations 430N' through 430N+M defines a perimeter covering a progressively smaller area from the representation 430N' to the representation 430N+M', thereby effecting the aforementioned expansion by progressively lesser amounts. Thus, because the line segments 426 connect respective points, the line segments 426 move as the points 424 are moved, thereby modifying the shape of the second vector image 422 in each of the representations 430N+1' through 430N+M−1' compared to the representation 430N+M' that is illustrated. After the (M−1)th modified second vector image 422 is displayed in the representation 430N+M−1', in the Step 370 it is replaced by the second vector image 422 in the representation 430N+M' by removing a last of the modifications to the second vector image 422 from the (M−1)th modified second vector image 422.

As illustrated, the second vector image 422 is a four-point star in the representation 430N+M', and the first modified second vector image 422 has a scattered, expanded appearance in the representation 430N+1'. The shape of the 2nd through (M−1)th modified second vector image 422 is not illustrated in the respective representations 430N+1' through 430N+M−1'. It is to be understood, however, that the representations 430N+1' through 430N+M−1' give the appearance of the star in the representation 430N+M' as gradually appearing from a chaotic appearance by having its points 424 progressively de-scatter or un-distort and converge on a smaller area until it has an orderly appearance as shown in the representation 430N+M'.

As illustrated, the first vector image 412 and its 1st through (N−1)th modifications are rendered (displayed) on the display 120 by the vectors display module 240 in the Steps 320 and 345 as a sequence of N' unique representations, each representation replacing a previous one. Additionally, the second vector image 422 and its 1st through (M−1)th modifications are rendered (displayed) on the display 120 by the vectors display module 240 in the Step 365 and 370 as a sequence of M' unique representations, each representation replacing a previous one. It is to be understood that N' may equal M' but need not be equal. In an exemplary embodiment N'=20 and M'=20.

Modification of the position of a point of the first vector image 412 or the second vector image 422 involves modifying both the x-coordinate and y-coordinate of the point in accordance with equations (1) to (3). Because the operation 400' involves a scaling down operation, Sin equation (3) is less than 1 for the first vector image 412 and greater than 1 for the second vector image 422.

Figure 5B:
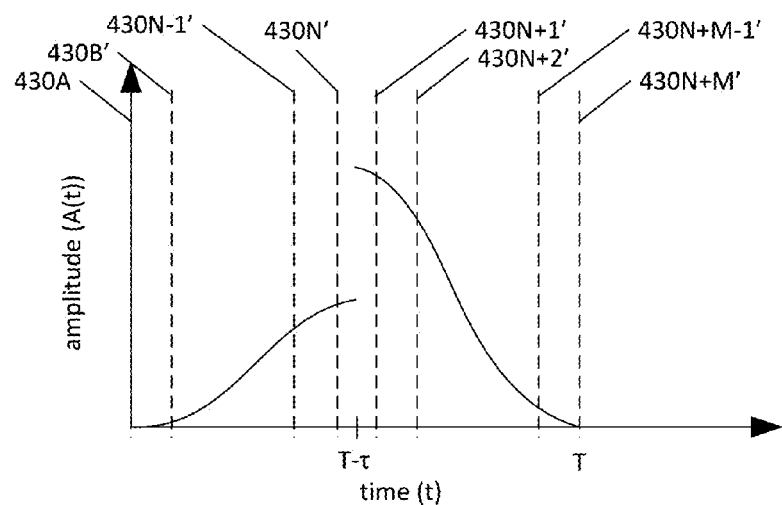

Referring now to FIG. 5B, there is illustrated a chart of the amplitude, A(t), plotted over time. The amplitude, A(t), specifies the amount of deviation or movement of the points of the 1st through (N−1)th modified first vector images 412 in the respective representations 430B' through 430N' over time compared to the first vector image 412 in the representation 430A, and the amount of deviation or movement of the points 424 of the 1st through (M−1)th modified second vector images 422 in the representations 430N+1' through 430N+M−1' over time compared to the vector image 422 in the representation 430N+M'. As seen in the chart, the deviation of the points 414 of the first vector image 412 increases over time, and the deviation of the points 424 of the second vector image 422 decreases over time. Comparing FIG. 5B to FIG. 5A, it is seen that the amplitude of the first half of A(t) in FIG. 5B may be less than that of FIG. 5A because S<1 in equation (3) in the operation 400' for the first vector image 412, and the amplitude of the second half of A(t) in FIG. 5B is greater than that of FIG. 5B because S>1 in equation (3) in the operation 400' for the second vector image 422. In other embodiments, the amplitude of A(t) in FIG. 5A may be greater than or equal to the amplitude of A(t) in FIG. 5B. Furthermore, it is contemplated that in other embodiments the amplitude of the first half of A(t) in FIG. 5B may be greater than the amplitude of the second half of A(t) in FIG. 5B.

Time t=T−τ corresponds to the time in which the (N−1)th modified vector image 412 in the representation 430N' is replaced by the 1st modified second vector image 422 in the representation 430N+1'. The replacement is chosen at this time because the deviation or movement of the points 414 of the (N−1)th modified first vector image 412 in the representation 430N' compared to the first vector image 412 in the representation 430A is at or near a maximum (or local maximum), as is the deviation or movement of the points 424 of the 1st modified second vector image 422 in the representation 430N+1' compared to the second vector image 422 in the representation 430N+M'.

Figure 5C:
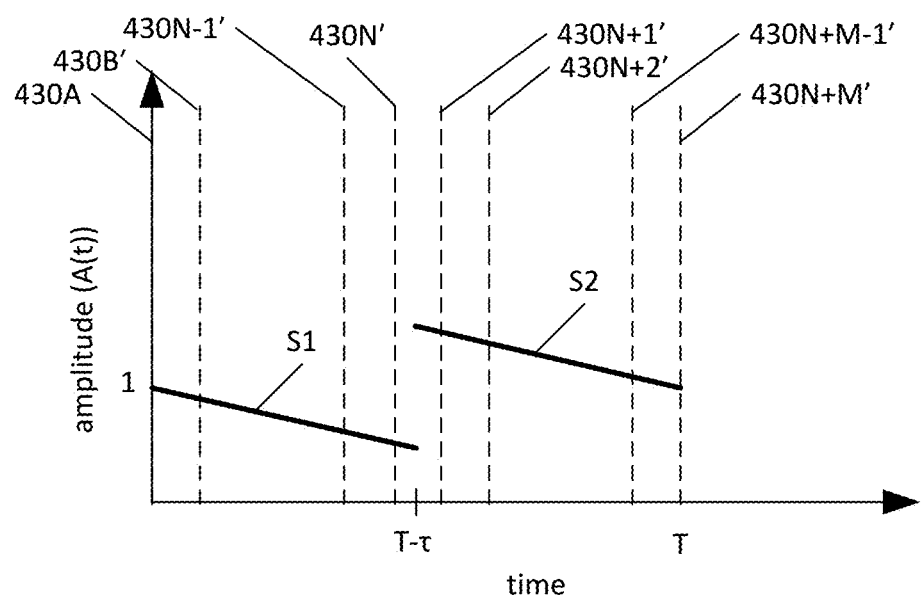
FIG. 5C illustrates a chart of scaling factors.

Referring now to FIG. 5C, there is illustrated a chart of scaling factors for the first vector image 412 and the second vector image 422 over time. Line S1 describes the scaling factor applied to the first vector image 412 over time. Line S2 describes the scaling factor applied to the second vector image 422 over time. As seen, the scaling factor applied to the first vector image 412 decreases over time from 1 at t=0 to a value greater than or equal to 0 at time T−τ, and the scaling factor applied to the second vector image 422 is greater than 1 at time T−τ and decreases over time to 1 at t=T.

The deviation or movement of each of the points may be distorted over time by a distortion factor, dist(p0,t), which is based on the original positions of each of the points in the first vector image 412 and in the second vector image 422. As expressed by dist(p0,t), the distortion applied to a point, p(t), depends on its original position and changes over time. The distortion factor, dist(p0,t), specifies the amount of distortion of the deviation of the x- and y-coordinates of the point, p(t), over time. For any of the points, the deviation or movement of the x- and y-coordinates of the point may be subject to the same distortion, dist(p0,t), or different distortions. For example, at a point in time, the deviation of the x-coordinate of a point may be distorted by +1.8, and the deviation of the y-coordinate of the point may also be distorted by +1.8. Alternatively, the y-coordinate of the point may be distorted by −2.4.

The distortion applied to the deviation or movement of the points 414 may depend on their relative position in the first vector image 412, and the distortion applied to the deviation or movement of the points 424 may depend on their relative position in the second vector image 422. Alternatively, the distortion applied to the deviation or movement of the points 414, 424 may be selected randomly across the vector image 412, 422, so that the distortion applied to the deviation or movement of one point as compared to another point is randomly selected.

Distortion may also be specified by the location of the points of the vector images 412 and 422 in grids overlaid upon the vector images 412 and 422. Illustrated in FIG. 6C is a grid 610C overlaid on the first vector image 412 in its initial representation 430A. The grid 610C comprises a plurality of cells 615C, each of which is assigned a distortion that is a function of time. If a point 414 of the first vector image 412 in its initial representation 430A falls within a cell 615C, the distortion specified by such cell is applied to such point when generating the representations 430B' through 430N' of the 1st through (N−1)th modified first vector images 412. Such distortion specifies an amount that the amount of deviation or movement of a point is to be distorted during each modification. It is to be understood that the grid 610A is for illustration purposes only. It illustrates that distortion may be applied to the amount of deviation or movement of the points 414 of the first vector image 412 based on the location of the points 414.

Illustrated in FIG. 6D is a grid 610D overlaid on the second vector image 422 in its final representation 430N+M'. The grid 610D comprises a plurality of cells 615D, each of which is assigned a distortion that is a function of time. If a point 424 of the second vector image 422 in its final representation 430N+M' falls within a cell 615D, the distortion specified by such cell is applied to such point when generating the representations 430N+1' through 430N+M−1' of the 1st through (M−1)th modified second vector images 422. Such distortion specifies an amount that the amount of deviation or movement of a point is to be distorted during each modification. It is to be understood that the grid 610D is for illustration purposes only. It illustrates that distortion may be applied to the amount of deviation or movement of the points of the second vector image 422 based on their relative positions in the final representation 430N+M' to generate the placement of the points 424 in the representations 430N+1' through 430N+M−1'.

The grids 610C and 610D may be normalized with respect to the first vector image 412 and the second vector image 422 so that the number of cells 615A and 615B and the relative placement thereof are the same. In an exemplary embodiment, because the number of cells 615C and 615D are equal, cells 615C and 615D having the same relative positions in the grids 610C and 610D specify the same or similar distortions. The result is that points in such cells 615C and 615D will scatter in similar ways and end up close to one another in the adjacent representations 430N' and 430N+1'. The result is that when the first modified vector image 412 in the representation 430N' is replaced by the second modified vector image 422 in the representation 430N+1' in the display 120, the replacement is not discernible to the viewer of the display 120.

Figure 4C:
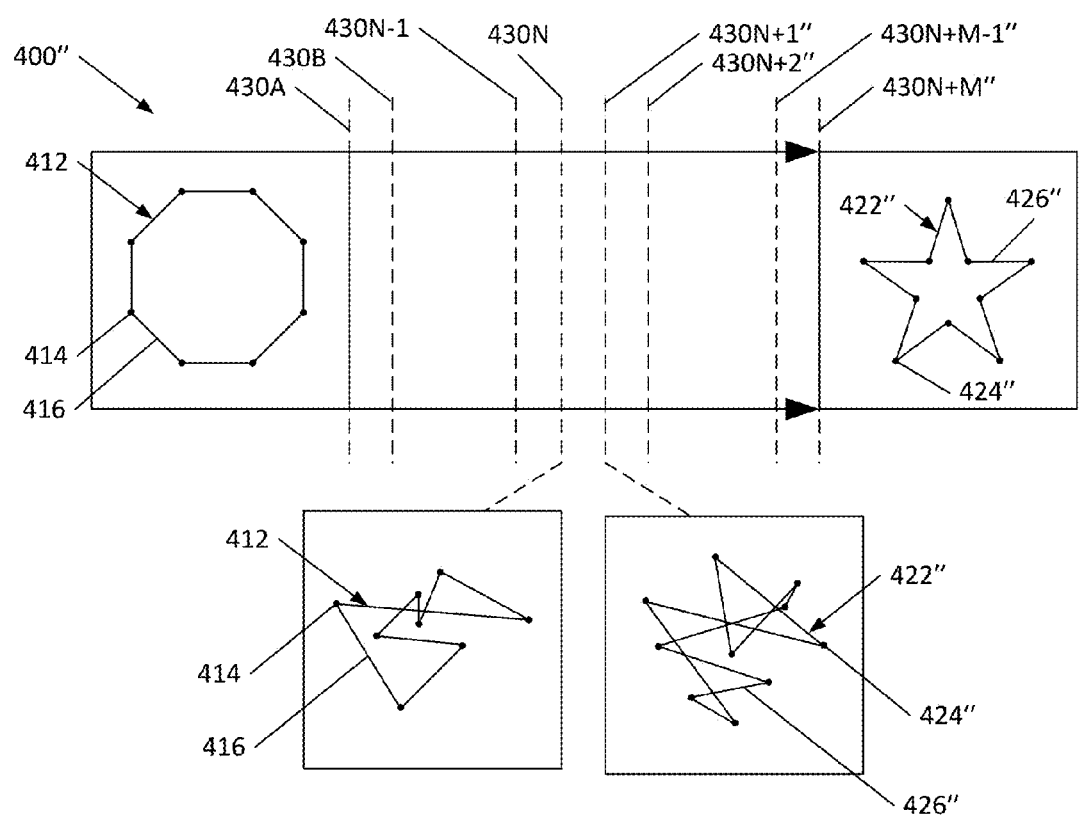

Referring now to FIG. 4C, there is illustrated an operation 400" performed by the architecture 200 using the method 300 for rendering a first vector image 412 in the first representation 430A in the display 120 of the computing device 100 and replacing it with a second vector image 422" in a second representation 430N+M" in the display 120 of the computing device 100.

The second vector image 422" comprises a plurality of points 424" and a plurality of line segments 426" connecting the points 424". Generally, the operation 400" involves displaying the first vector image 412, Step 320, modifying one or more points 414 of the first vector image 412, Step 340, displaying the modifications to the first vector image 412 to display at least one modified first vector image 412, Step 345, modifying one or more points 424 of the second vector image 422'' to form a modified second vector image 422'', Step 360, displaying the modified second vector image 422'' by replacing the modified first vector image 412 with the modified second vector image 422'', Step 365, and removing the modifications to the second vector image 422'' to display the second vector image 422'', Step 370. The number of points 414 of the first vector image 412 may differ from the number of points 424'' of the second vector image 422''. The operation 400'' is similar to the operation 400 but differs in that the operation 400'' replaces the modified first vector image 412 in the representation 430N with a modified second vector image 422'' in the representation 430N+1'' having a different number of points 424'' in the Step 365 of the method 300 performed by the vectors display module 240. Otherwise, the operation 400'' is similar to the operation 400.

Figure 4D:
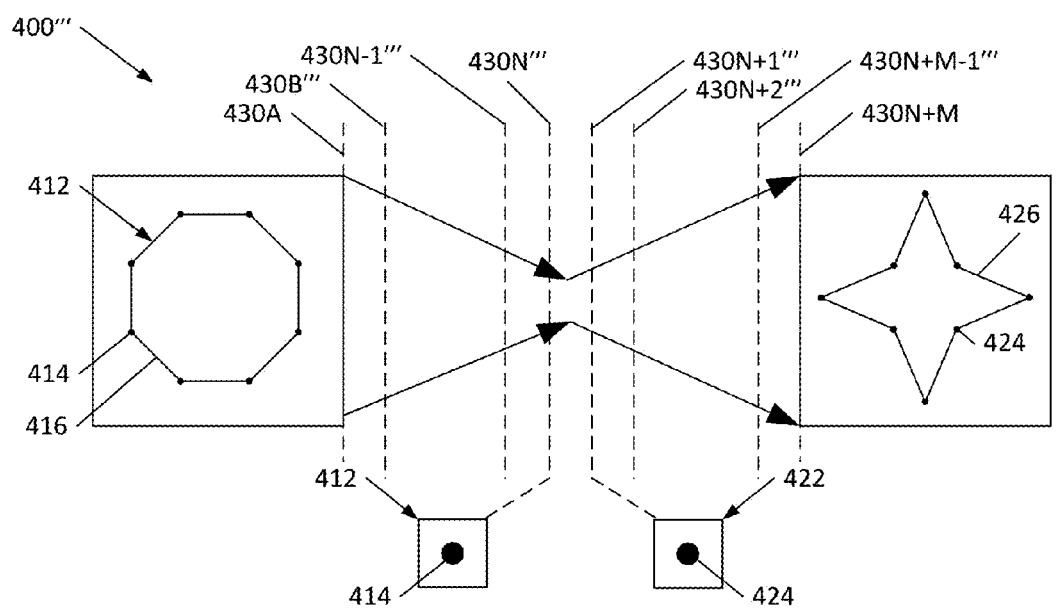

Referring now to FIG. 4D, there is illustrated an operation 400''' performed by the architecture 200 using the method 300 for rendering a first vector image 412 in the first representation 430A in the display 120 of the computing device 100 and replacing it with a second vector image 422 in a second representation 430N+M''' in the display 120 of the computing device 100, while transitioning through a dot.

The first vector image 412 in FIG. 4D is the same as the first vector image 412 in FIG. 4A, and the second vector image 422 in FIG. 4D is the same as the first vector image 422 in FIG. 4A. The operation 400''' differs from the operation 400 in that the first vector image 412 is progressively modified and scaled down in the representations 430B''' through 430N''' to a dot in which the segments 416 are not discernable in the representation 430N'''. The dot is the replaced within another dote in the representation 430N+1''', which dot is a first modified second vector image 422. The modifications to the second vector image 422 are removed in the representations 430N+1''' through 430N+M''', while the second vector image 422 is expanded to the representation 430N+M'''.

Generally, the operation 400''' involves displaying the first vector image 412, Step 320, modifying one or more points 414 of the first vector image 412 and shrinking the first vector image 412, Step 340, displaying the modifications to the first vector image 412 to display at least one modified first vector image 412, Step 345, modifying one or more points 424 of the second vector image 422 and expanding the second vector image 422 to form a modified second vector image, Step 360, displaying the modified second vector image 422 by replacing the modified first vector image 412 with the modified second vector image 422, Step 365, and removing the modifications to the second vector image 422 while expanding the second vector image 422 to display the second vector image 422, Step 370. The operation 400''' is similar to the operation 400' in that scaling is performed, but rather than scaling down from the first vector image 412 to the second vector image 422, the operation 400''' scales the first vector image 412 down to a dot in the representation 430N''', which dot is replaced by another dot in the representation 430N+1''', which is then scaled up to the second vector image 422 in the representation 430N+M'''. Otherwise, the operation 400''' is similar to the operation 400.

Description is made herein of modifying x and y coordinates of a point. It is to be understood that points described by more than two dimensions and modifications of such points in accordance with the exemplary systems and methods described herein are contemplated.

What is claimed is:

1. A computer-implemented method for displaying a vector graphic and replacing the vector graphic with a new vector graphic, the method comprising steps of:
retrieving, by a processing device, a first set of points describing a first vector for a first display element from a first memory location;
retrieving, by the processing device, a second set of points describing a second vector for a second display element from a second memory location;
modifying, by the processing device, the first set of points by modifying one or more points in the first set of points to form a modification of the first vector;
modifying, by the processing device, the second set of points by modifying one or more points in the second set of points to form a modification of the second vector; and
displaying, on a display coupled to the processing device, the first vector, then displaying the modification of the first vector to display a modified first vector comprising one or more points, then replacing the modified first vector with a modified second vector comprising one or more points in the display, and then removing the modification of the second vector to display the second vector,
wherein the step of replacing the modified first vector with the modified second vector is performed when a deviation of the one or more points of the modified first vector is at or near a maximum.

2. The method of claim 1, wherein:
the step of modifying, by the processing device, the first set of points further comprises repeatedly modifying the first set of points by repeatedly modifying the one or more points in the first set of points to form a plurality of modifications to the first vector;
the step of modifying, by the processing device, the second set of points further comprises repeatedly modifying the second set of points by repeatedly modifying the one or more points in the second set of points to form a plurality of modifications to the second vector;
the step of displaying the modification of the first vector to display a modified first vector comprising one or more points further comprises sequentially adding one of the plurality of modifications to the first vector and replacing the one of the plurality of modifications to the first vector with another of the plurality of modifications to the first vector until all of the plurality of modifications to the first vector have been displayed; and
the step of removing the modification of the second vector to display the second vector comprises sequentially removing one of the plurality of modifications to the second vector and replacing the one of the plurality of modifications to the second vector with another of the plurality of modifications to the second vector until all of the plurality of modifications to the second vector have been displayed and removed.

3. The method of claim 2, wherein:
the step of modifying, by the processing device, the first set of points further comprises repeatedly applying, by the processing device, a deviation to the one or more points in the first set of points to form the plurality of modifications to the first vector; and
the step of modifying, by the processing device, the second set of points further comprises repeatedly applying, by the processing device, a deviation to the one or more points in the second set of points to form the plurality of modifications to the second vector.

4. The method of claim 3, wherein the deviation applied to the one or more points in the first set of points specifies a distance by which each of the one or more points in the first set of points is to move, and wherein the deviation applied to the one or more points in the second set of points specifies a distance by which each of the one or more points in the second set of points is to move.

5. The method of claim 3, wherein:
repeatedly applying, by the processing device, the deviation to the one or more points in the first set of points comprises applying a distortion to the deviation applied to the one or more points in the first set of points based on a relative position of each of the one or more points in the first set of points; and
repeatedly applying, by the processing device, the deviation to the one or more points in the second set of points comprises applying a distortion to the deviation applied to the one or more points in the second set of points based on a relative position of each of the one or more points in the second set of points.

6. The method of claim 1, wherein the first vector specifies a first shape, and the modified first vector specifies a second shape different from the first shape.

7. The method of claim 6, wherein the modified second vector specifies a third shape different from the first shape and the second shape, and the second vector specifies a fourth shape.

8. The method of claim 7, wherein the first shape and the fourth shape are the same.

9. The method of claim 1,
wherein the steps of displaying, on the display coupled to the processing device, the first vector, then displaying the modification of the first vector to display the modified first vector comprising one or more points, respectively comprise:
displaying, in a first screen in the display, the first vector, and
then displaying, in the first screen in the display, the modification of the first vector to display the modified first vector comprising one or more points; and
wherein the steps of then replacing the modified first vector with the modified second vector comprising one or more points in the display, and then removing the modification of the second vector to display the second vector, respectively comprise:
then replacing the modified first vector with a modified second vector comprising one or more points in a second screen of the display, and
then removing the modification of the second vector to display the second vector in the second screen of the display.

10. The method of claim 1, wherein the step of replacing the modified first vector with the modified second vector is performed when a deviation of the one or more points of the modified first vector is at or near a maximum and a deviation of the one or more points of the modified second vector is at or near a maximum.

11. The method of claim 1, wherein the deviation is specified by a time-variant function that specifies at least one local maximum that determines when the step of replacing the modified first vector with the modified second vector is performed.

12. A tangible non-transitory computer readable medium comprising software instructions stored thereon that when executed by a processing device cause the processing device to perform steps of:
retrieving, by the processing device, a first set of points describing a first vector for a first display element from a first memory location;
retrieving, by the processing device, a second set of points describing a second vector for a second display element from a second memory location;
modifying, by the processing device, the first set of points by modifying one or more points in the first set of points to form a modification of the first vector;
modifying, by the processing device, the second set of points by modifying one or more points in the second set of points to form a modification of the second vector; and
displaying, on a display coupled to the processing device, the first vector, then displaying the modification of the first vector to display a modified first vector comprising one or more points, then replacing the modified first vector with a modified second vector comprising one or more points in the display, and then removing the modification of the second vector to display the second vector,
wherein replacing the modified first vector with the modified second vector is performed when a deviation of the one or more points of the modified first vector is at or near a maximum.

13. The tangible computer readable medium of claim 12, wherein:
the step of modifying, by the processing device, the first set of points further comprises repeatedly modifying the first set of points by repeatedly modifying the one or more points in the first set of points to form a plurality of modifications to the first vector;
the step of modifying, by the processing device, the second set of points further comprises repeatedly modifying the second set of points by repeatedly modifying the one or more points in the second set of points to form a plurality of modifications to the second vector;
the step of displaying the modification of the first vector to display a modified first vector comprising one or more points further comprises sequentially adding one of the plurality of modifications to the first vector and replacing the one of the plurality of modifications to the first vector with another of the plurality of modifications to the first vector until all of the plurality of modifications to the first vector have been displayed; and
the step of removing the modification of the second vector to display the second vector comprises sequentially removing one of the plurality of modifications to the second vector and replacing the one of the plurality of modifications to the second vector with another of the plurality of modifications to the second vector until all of the plurality of modifications to the second vector have been displayed and removed.

14. The tangible computer readable medium of claim 13, wherein:
the step of modifying, by the processing device, the first set of points further comprises repeatedly applying, by the processing device, a deviation to the one or more points in the first set of points to form the plurality of modifications to the first vector; and
the step of modifying, by the processing device, the second set of points further comprises repeatedly applying, by the processing device, a deviation to the one or more points in the second set of points to form the plurality of modifications to the second vector.

15. The tangible computer readable medium of claim 14, the deviation applied to the one or more points in the first set of points specifies a distance by which each of the one or more points in the first set of points is to move, and wherein the deviation applied to the one or more points in the second set of points specifies a distance by which each of the one or more points in the second set of points is to move.

16. The tangible computer readable medium of claim 15, wherein:
repeatedly applying, by the processing device, the deviation to the one or more points in the first set of points comprises applying a distortion to the deviation applied to the one or more points in the first set of points based on a relative position of each of the one or more points in the first set of points; and
repeatedly applying, by the processing device, the deviation to the one or more points in the second set of points comprises applying a distortion to the deviation applied to the one or more points in the second set of points based on a relative position of each of the one or more points in the second set of points.

17. The tangible computer readable medium of claim 12, wherein the first vector specifies a first shape, and the modified first vector specifies a second shape different from the first shape.

18. The tangible computer readable medium of claim 17, wherein the modified second vector specifies a third shape different from the first shape and the second shape, and the second vector specifies a fourth shape.

19. The tangible computer readable medium of claim 18, wherein the first shape and the second shape are the same.

20. The tangible computer readable medium of claim 12, wherein the steps of displaying, on the display coupled to the processing device, the first vector, then displaying the modification of the first vector to display the modified first vector comprising one or more points, respectively comprise:
displaying, in a first screen in the display, the first vector, and
then displaying, in the first screen in the display, the modification of the first vector to display the modified first vector comprising one or more points; and
wherein the steps of then replacing the modified first vector with the modified second vector comprising one or more points in the display, and then removing the modification of the second vector to display the second vector, respectively comprise:
then replacing the modified first vector with a modified second vector comprising one or more points in a second screen of the display, and
then removing the modification of the second vector to display the second vector in the second screen of the display.

21. The tangible computer readable medium of claim 12, wherein the step of replacing the modified first vector with the modified second vector is performed when a deviation of the one or more points of the modified first vector is at or near a maximum and a deviation of the one or more points of the modified second vector is at or near a maximum.

22. The tangible computer readable medium of claim 12, wherein the deviation is specified by a time-variant function that specifies at least one local maximum that determines when the step of replacing the modified first vector with the modified second vector is performed.

23. A wearable device comprising:
a display;
a memory; and
a processor coupled to the display and to the memory, the processor for:
retrieving a first set of points describing a first vector for a first display element from a first location in the memory;
retrieving a second set of points describing a second vector for a second display element from a second location in the memory;
modifying, by the processing device, the first set of points by modifying one or more points in the first set of points to form a modification of the first vector;
modifying, by the processing device, the second set of points by modifying one or more points in the second set of points to form a modification of the second vector; and
displaying, on a display coupled to the processing device, the first vector, then displaying the modification of the first vector to display a modified first vector comprising one or more points, then replacing the modified first vector with a modified second vector comprising one or more points in the display, and then removing the modification of the second vector to display the second vector,
wherein replacing the modified first vector with the modified second vector is performed when a deviation of the one or more points of the modified first vector is at or near a maximum.

24. The wearable device of claim 23, wherein:
the modifying of the first set of points further comprises repeatedly modifying the first set of points by repeatedly modifying the one or more points in the first set of points to form a plurality of modifications to the first vector;
the modifying of the second set of points further comprises repeatedly modifying the second set of points by repeatedly modifying the one or more points in the second set of points to form a plurality of modifications to the second vector;
the displaying of the modification of the first vector to display a modified first vector comprising one or more points further comprises sequentially adding one of the plurality of modifications to the first vector and replacing the one of the plurality of modifications to the first vector with another of the plurality of modifications to the first vector until all of the plurality of modifications to the first vector have been displayed; and
the removing of the modification of the second vector to display the second vector comprises sequentially removing one of the plurality of modifications to the second vector and replacing the one of the plurality of modifications to the second vector with another of the plurality of modifications to the second vector until all of the plurality of modifications to the second vector have been displayed and removed.

25. The wearable device of claim 24, wherein:
the modifying of the first set of points further comprises repeatedly applying, by the processing device, a deviation to the one or more points in the first set of points to form the plurality of modifications to the first vector; and
the modifying of the second set of points further comprises repeatedly applying, by the processing device, a deviation to the one or more points in the second set of points to form the plurality of modifications to the second vector.

26. The wearable device of claim 25, wherein the deviation applied to the one or more points in the first set of points specifies a distance by which each of the one or more points in the first set of points is to move, and wherein the deviation applied to the one or more points in the second set of points specifies a distance by which each of the one or more points in the second set of points is to move.

27. The wearable device of claim 25, wherein:
the repeatedly applying the deviation to the one or more points in the first set of points comprises applying a distortion to the deviation applied to the one or more points in the first set of points based on a relative position of each of the one or more points in the first set of points; and
the repeatedly applying the deviation to the one or more points in the second set of points comprises applying a distortion to the deviation applied to the one or more points in the second set of points based on a relative position of each of the one or more points in the second set of points.

28. The wearable device of claim 23, wherein the first vector specifies a first shape, and the modified first vector specifies a second shape different from the first shape.

29. The wearable device of claim 28, wherein the modified second vector specifies a third shape different from the first shape and the second shape, and the second vector specifies a fourth shape.

30. The wearable device of claim 29, wherein the first shape and the fourth shape are the same.

31. The wearable device of claim 23,
wherein the displaying, on the display coupled to the processing device, the first vector, and the then displaying the modification of the first vector to display the modified first vector comprising one or more points, respectively comprise:
displaying, in a first screen in the display, the first vector, and
then displaying, in the first screen in the display, the modification of the first vector to display the modified first vector comprising one or more points; and
wherein the replacing the modified first vector with the modified second vector comprising one or more points in the display, and the then removing the modification of the second vector to display the second vector, respectively comprise:
then replacing the modified first vector with a modified second vector comprising one or more points in a second screen of the display, and
then removing the modification of the second vector to display the second vector in the second screen of the display.

32. The wearable device of claim 23, wherein the replacing of the modified first vector with the modified second vector is performed when a deviation of the one or more points of the modified first vector is at or near a maximum and a deviation of the one or more points of the modified second vector is at or near a maximum.

33. The wearable device of claim 23, wherein the deviation is specified by a time-variant function that specifies at least one local maximum that determines when the replacing of the modified first vector with the modified second vector is performed.

34. The wearable device of claim 23 wherein the wearable device is a smart watch.

* * * * *